United States Patent
Meng

(10) Patent No.: US 10,296,133 B2
(45) Date of Patent: May 21, 2019

(54) TOUCH SCREEN AND TOUCH POSITIONING METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Zhaohui Meng, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 15/555,308

(22) PCT Filed: Apr. 11, 2017

(86) PCT No.: PCT/CN2017/080056
§ 371 (c)(1),
(2) Date: Sep. 1, 2017

(87) PCT Pub. No.: WO2017/202150
PCT Pub. Date: Nov. 30, 2017

(65) Prior Publication Data
US 2018/0107330 A1    Apr. 19, 2018

(30) Foreign Application Priority Data
May 26, 2016  (CN) .......................... 2016 1 0362020

(51) Int. Cl.
G06F 3/041    (2006.01)
G06F 3/044    (2006.01)
G04G 21/08    (2010.01)

(52) U.S. Cl.
CPC ............ *G06F 3/0416* (2013.01); *G06F 3/044* (2013.01); *G04G 21/08* (2013.01); *G06F 2203/04111* (2013.01)

(58) Field of Classification Search
CPC ....................................................... G06F 3/041
See application file for complete search history.

(56) References Cited

U.S. PATENT DOCUMENTS

2015/0040052 A1    2/2015    Noel et al.
2016/0291710 A1*   10/2016   Kang ...................... G06F 3/041
2018/0107330 A1    4/2018    Meng

FOREIGN PATENT DOCUMENTS

CN          204360355 U      5/2015
CN          104978071 A      10/2015
(Continued)

OTHER PUBLICATIONS

Written Opinion from corresponding PCT Application No. PCT/CN2017/080056 dated Jun. 9, 2017 (6 pages).
(Continued)

*Primary Examiner* — Gerald Johnson
(74) *Attorney, Agent, or Firm* — Harness, Dickey & Pierce, P.L.C.

(57) ABSTRACT

The present disclosure discloses a touch screen and a touch positioning method thereof, and a display device. The touch screen comprises: a plurality of mutually insulated fan-shaped first touch sensing electrodes and a plurality of mutually insulated and non-overlapped second touch sensing electrodes mutually insulated from the first touch sensing electrodes. The fan-shaped first touch sensing electrodes are arranged in a circle, and each of the second touch sensing electrodes is shaped like a non-closed ring concentrically arranged with the circle.

20 Claims, 7 Drawing Sheets

(56) References Cited

FOREIGN PATENT DOCUMENTS

| CN | 105242814 A | 1/2016 |
| CN | 105930012 A | 9/2016 |

OTHER PUBLICATIONS

International Search Report from corresponding PCT Application No. PCT/CN2017/080056 dated Jun. 9, 2017 (5 pages).

* cited by examiner

TOUCH SCREEN AND TOUCH POSITIONING METHOD THEREOF, AND DISPLAY DEVICE

CROSS-REFERENCE TO RELATED APPLICATION

This application claims the benefit and priority of Chinese Patent Application No. 201610362020.2 filed on May 26, 2016, the entire content of which is incorporated herein by reference as a part of the present application.

TECHNICAL FIELD

The present disclosure relates to the field of display technologies, and more particularly, to a touch screen and a touch positioning method thereof, and a display device.

BACKGROUND

With the rapid development of display technologies, touch screens (Touch Screen Panel) have already been popularized in people's lives.

Touch electrodes in the existing touch screens generally are strip electrode structures with two layers of intersecting different planes. When the touch electrode structures are used in irregular-shaped touch screen such as a circular watch, different lengths of the strip electrodes may cause that resistances of the strip electrodes are different. To ensure a high touch control precision, it is undoubtedly to put forward higher requirements for signal stability of touch control chips in the touch screens and requirements for determining a resolution capability of a contact position. Therefore, the above touch electrode structures are not applicable to the irregular-shaped touch screens.

SUMMARY

It is a technical problem to be solved how to design a touch electrode structure in an irregular-shaped touch screen.

On this account, embodiments of the present disclosure provide a touch screen and a touch positioning method thereof, and a display device, so as to design the touch electrode structure in the irregular-shaped touch screen.

Therefore, an embodiment of the present disclosure provides a touch screen, which includes: a plurality of mutually insulated fan-shaped first touch sensing electrodes and a plurality of mutually insulated and non-overlapped second touch sensing electrodes mutually insulated from the first touch sensing electrodes. A plurality of the first touch sensing electrodes are arranged in a circle, and each of the second touch sensing electrodes is shaped like a ring concentrically arranged with the circle.

In a possible implementation, the touch screen provided by the embodiment of the present disclosure further includes: a plurality of mutually insulated third touch sensing electrode wires electrically connecting, in one-to-one correspondence, to the first touch sensing electrodes, a plurality of mutually insulated first touch sensing electrode wires extending along a radial direction of the circle, electrically connecting, in one-to-one correspondence, to the second touch sensing electrodes, a plurality of mutually insulated second touch sensing electrode wires electrically connecting to the first touch sensing electrode wires in one-to-one correspondence, and a touch control chip. Each of the first touch sensing electrodes electrically connects the touch control chip via the corresponding first touch sensing electrode wire, and each of the second touch sensing electrodes electrically connects the touch control chip via the corresponding second touch sensing electrode wire and the corresponding third touch sensing electrode wire.

In a possible implementation, in the touch screen provided by the embodiment of the present disclosure, each of the first touch sensing electrodes and each of the second touch sensing electrodes are arranged in a same layer. The first touch sensing electrode includes a plurality of first touch sensing sub-electrodes arranged along a radial direction and non-overlapped with each of the second touch sensing electrodes. The touch screen may further includes a first electrical bridge configured to electrically connect two adjacent first touch sensing sub-electrodes in each of the first touch sensing electrodes.

In a possible implementation, in the touch screen provided by the embodiment of the present disclosure, the second touch sensing electrode wire is positioned at a spacing between two adjacent first touch sensing electrodes.

In a possible implementation, the first touch sensing electrode and the second touch sensing electrode are arranged at different layers, and the touch screen further includes an insulating layer arranged between the first touch sensing electrode and the second touch sensing electrode.

In a possible implementation, in the touch screen provided by the embodiment of the present disclosure, an opening of the non-closed ring of the second touch sensing electrode aligns along the radial direction of the circle. One end of the second touch sensing electrode electrically connects the corresponding second touch sensing electrode wire.

In a possible implementation, in the touch screen provided by the embodiment of the present disclosure, an arrangement direction of the opening of each of the second touch sensing electrodes is mutually parallel to at least two radiuses. Each of the second touch sensing electrodes includes a plurality of second touch sensing sub-electrodes arranged along a circumferential direction of the non-closed ring and non-overlapped with each of the first touch sensing electrode wires.

In a possible implementation, the touch screen may further includes a second electrical bridge configured to electrically connect two adjacent second touch sensing sub-electrodes in each of the second touch sensing electrodes.

In a possible implementation, in the touch screen provided by the embodiment of the present disclosure, an opening of the non-closed ring of each of the second touch sensing electrodes does not align along the radial direction of the circle. Each of the first touch sensing electrode wires includes a plurality of second touch sensing sub-electrode wires arranged along a radial direction and non-overlapped with each of the second touch sensing electrodes. The touch screen further includes a third electrical bridge configured to electrically connect two adjacent second touch sensing sub-electrode wires in each of the first touch sensing electrode wires.

In a possible implementation, in the touch screen provided by the embodiment of the present disclosure, two ends of each of the second touch sensing electrodes shaped like the non-closed ring is a first end and a second end respectively. The first ends of a part of the second touch sensing electrodes connect the corresponding first touch sensing electrode wires, and the second ends of another part of the second touch sensing electrodes connect the corresponding first touch sensing electrode wires.

In a possible implementation, in the touch screen provided by the embodiment of the present disclosure, the second touch sensing electrodes connected to the corresponding first touch sensing electrode wires via the first ends and the second touch sensing electrodes connected to the corresponding first touch sensing electrode wires via the second ends are arranged at intervals.

In a possible implementation, in the touch screen provided by the embodiment of the present disclosure, each of the first touch sensing electrodes is substantially equal in area.

In a possible implementation, in the touch screen provided by the embodiment of the present disclosure, a radius difference of two adjacent second touch sensing electrodes is substantially equal.

In a possible implementation, in the touch screen provided by the embodiment of the present disclosure, the first touch sensing electrodes, the second touch sensing electrodes and the first touch sensing electrode wires are positioned within a display area of the touch screen, and the first touch sensing electrodes, the second touch sensing electrodes and the first touch sensing electrode wires are transparent. The third touch sensing electrode wires, the second touch sensing electrode wires and the touch control chip are positioned within a bezel area of the touch screen.

In a possible implementation, in the touch screen provided by the embodiment of the present disclosure, the touch screen is used as a dial of a watch.

An embodiment of the present disclosure further provides a display device, which includes the foregoing touch screen provided by the embodiment of the present disclosure.

An embodiment of the present disclosure further provides a touch positioning method used in the touch screen. The method includes: loading a touch scanning signal for the first touch sensing electrode, and detecting a voltage signal of the second touch sensing electrode coupled to the touch scanning signal; alternatively, loading a touch scanning signal for the second touch sensing electrode, and detecting a voltage signal of the first touch sensing electrode coupled to the touch scanning signal.

DETAILED DESCRIPTION

Figure 1:
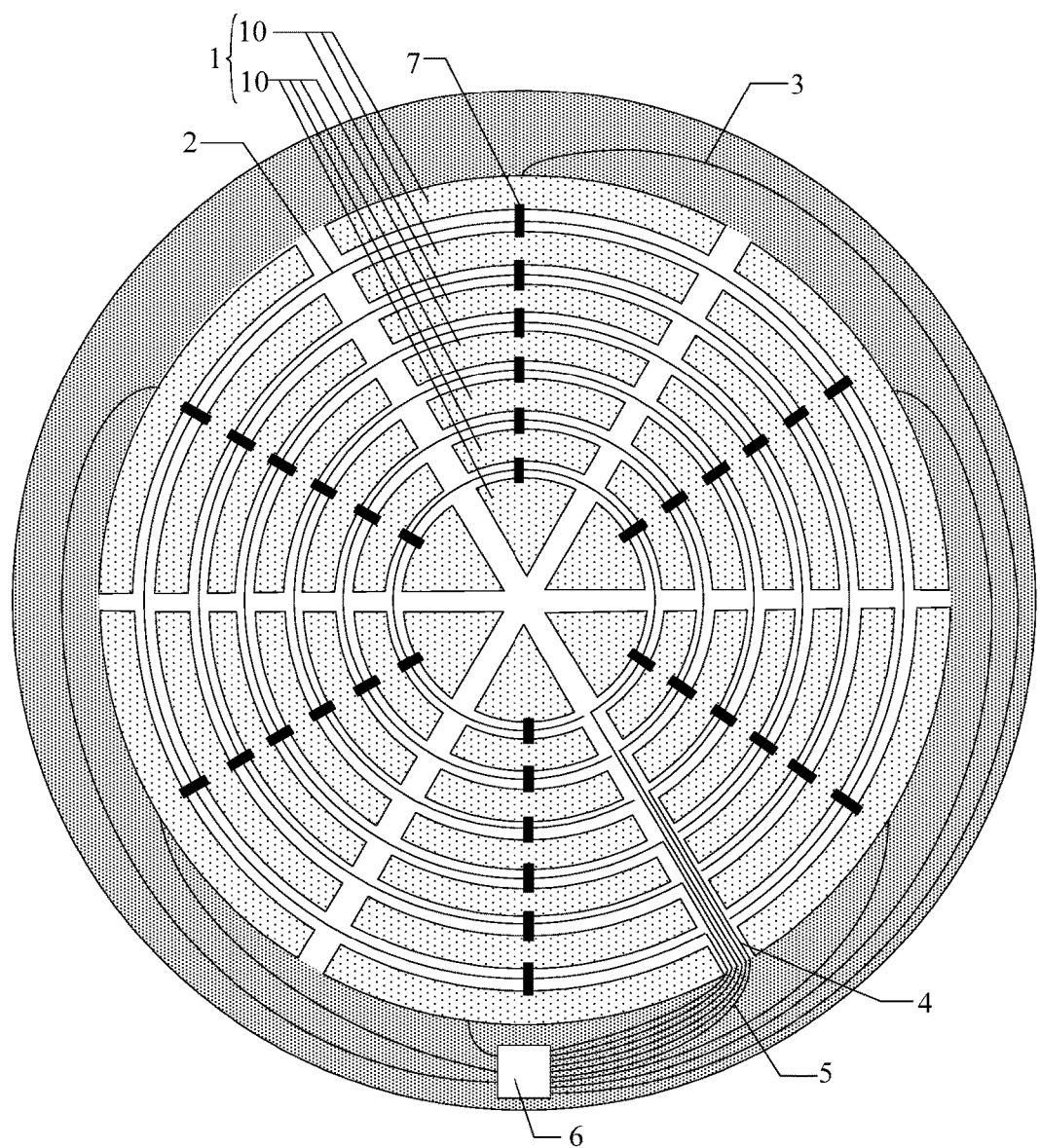
FIG. 1 is a schematic structural diagram of a touch screen according to an embodiment of the present disclosure.

Specific implementations of the touch screen, the touch positioning method thereof and the display device provided by the embodiments of the present disclosure are described in detail with reference to the accompanying drawings in the following.

As used herein and in the appended claims, the singular form of a word includes the plural, and vice versa, unless the context clearly dictates otherwise. Thus, singular words are generally inclusive of the plurals of the respective terms. Similarly, the words "include" and "comprise" are to be interpreted inclusively rather than exclusively. Likewise, the terms "include" and "or" should all be construed to be inclusive, unless such an interpretation is clearly prohibited from the context. Where used herein the term "examples," particularly when followed by a listing of terms is merely exemplary and illustrative, and should not be deemed to be exclusive or comprehensive.

Unless otherwise defined, all the technical or scientific terms used herein have the same meanings as commonly understood by one of ordinary skill in the art to which the present disclosure belongs. The terms "first", "second" and so on used in the specification and claims of the present disclosure do not denote any sequence, quantity or importance, but instead are merely used to distinguish different constituent parts. Likewise, the terms such as "a", "an" and so on do not indicate quantitative limitation, but indicate the existence of at least one. The terms "connect" or "connection" and so on are not limited to physical or mechanical connection, and also may include electrical connection, either directly or indirectly. "On," "under," "right," "left" and the like are only used to indicate relative position relationship, and when the absolute position of the object which is described is changed, the relative position relationship may be changed accordingly.

Shapes and sizes of film layers in the accompanying drawings do not reflect true scale thereof, and the objective is merely to schematically illustrate contents of the present disclosure.

An embodiment of the present disclosure provides a touch screen as shown in FIG. 1-FIG. 6, which includes: a plurality of mutually insulated fan-shaped first touch sensing electrodes 1 (six first touch sensing electrodes 1 are respectively shown in FIG. 1-FIG. 6) and a plurality of mutually insulated and non-overlapped second touch sensing electrodes 2 (six second touch sensing electrodes 2 are respectively shown in FIG. 1-FIG. 6) mutually insulated from the first touch sensing electrodes 1.

A plurality of the fan-shaped first touch sensing electrodes 1 are arranged in a circle; and each of the second touch sensing electrodes 2 is shaped like a non-closed ring concentrically arranged with the circle.

In the touch screen provided by the embodiments of the present disclosure, a contact position may be determined by determining an angle variable by way of the first touch sensing electrode and by determining a radius variable by way of the second touch sensing electrode. Compared with a touch control structure of an existing strip electrode with two layers of intersecting different planes, the touch screen may reduce requirements for signal stability of the touch control chip and requirements for determining a resolution capability of the contact position, and thus is more applicable to a circular irregular-shaped touch screen.

In a specific implementation, the touch screen (as shown in FIG. 1-FIG. 6) provided by the embodiment of the present disclosure may further include: a plurality of mutually insulated third touch sensing electrode wires 3 electrically connecting and in one-to-one correspondence, to the first touch sensing electrodes 1, a plurality of mutually insulated first touch sensing electrode wires 4 extending along a radial direction, electrically connecting to the second touch sensing electrodes 2 in one-to-one correspondence, a plurality of mutually insulated second touch sensing electrode wires 5 electrically connecting in one-to-one correspondence to the first touch sensing electrode wires 4, and a touch control chip 6. The first touch sensing electrodes 1 electrically connect the touch control chip 6 via the corresponding third touch sensing electrode wires 3, and the second touch sensing electrodes 2 electrically connect the touch control chip 6 via the corresponding first touch sensing electrode wires 4 and the second touch sensing electrode wires 5.

Figure 2:
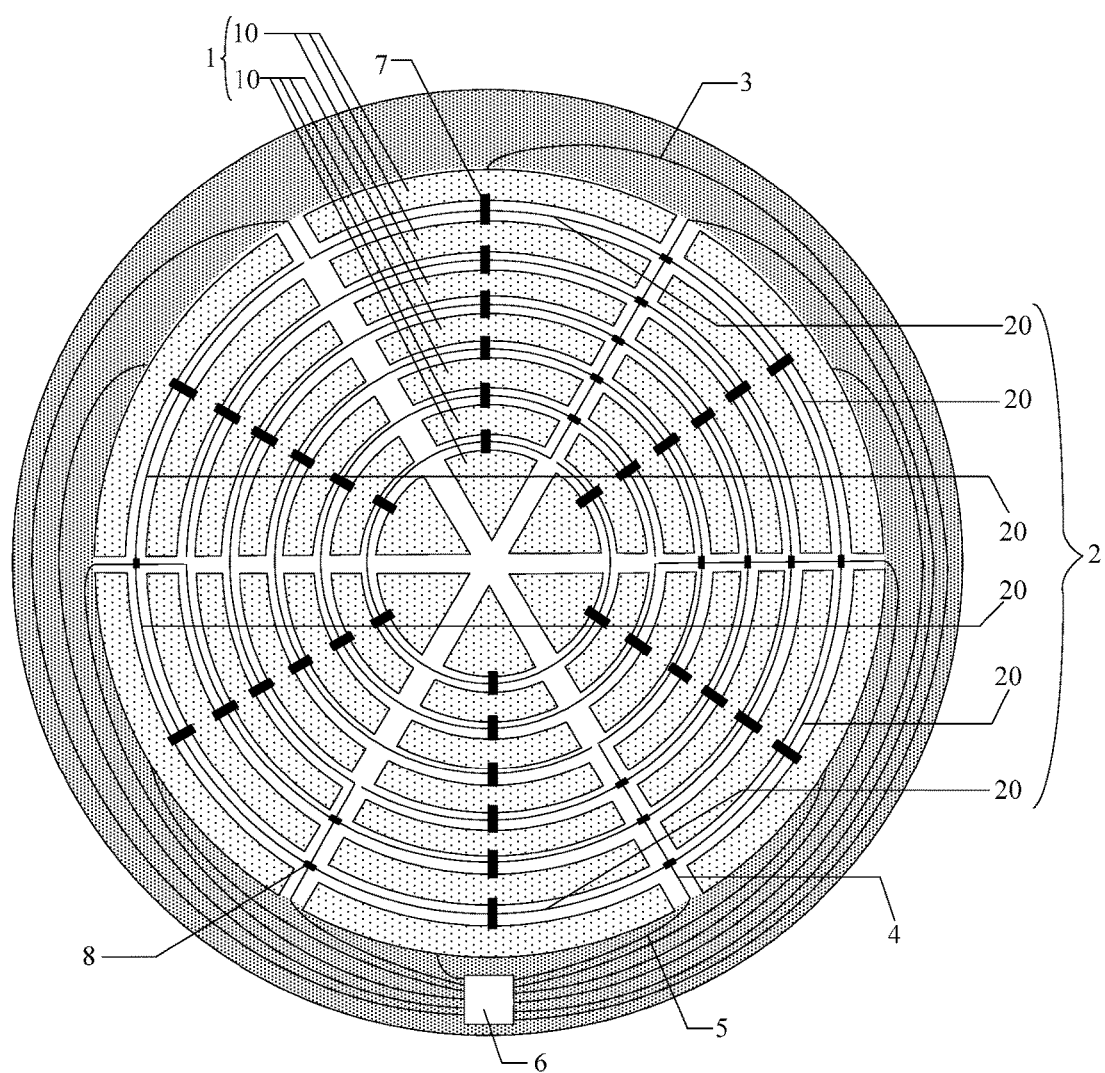
FIG. 2 is a schematic structural diagram of a touch screen according to an embodiment of the present disclosure.
Figure 3:
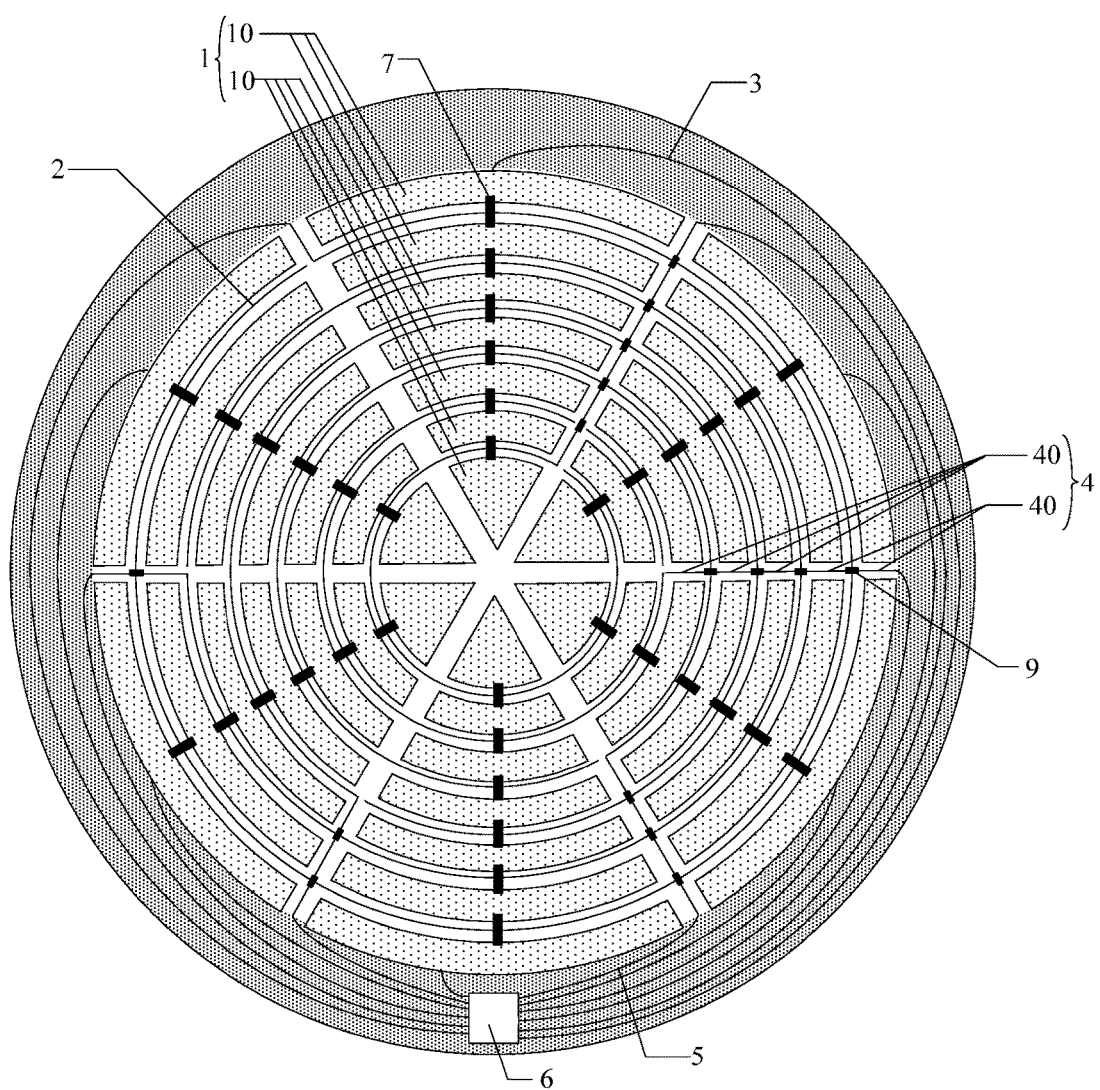
FIG. 3 is a schematic structural diagram of a touch screen according to an embodiment of the present disclosure.
Figure 4:
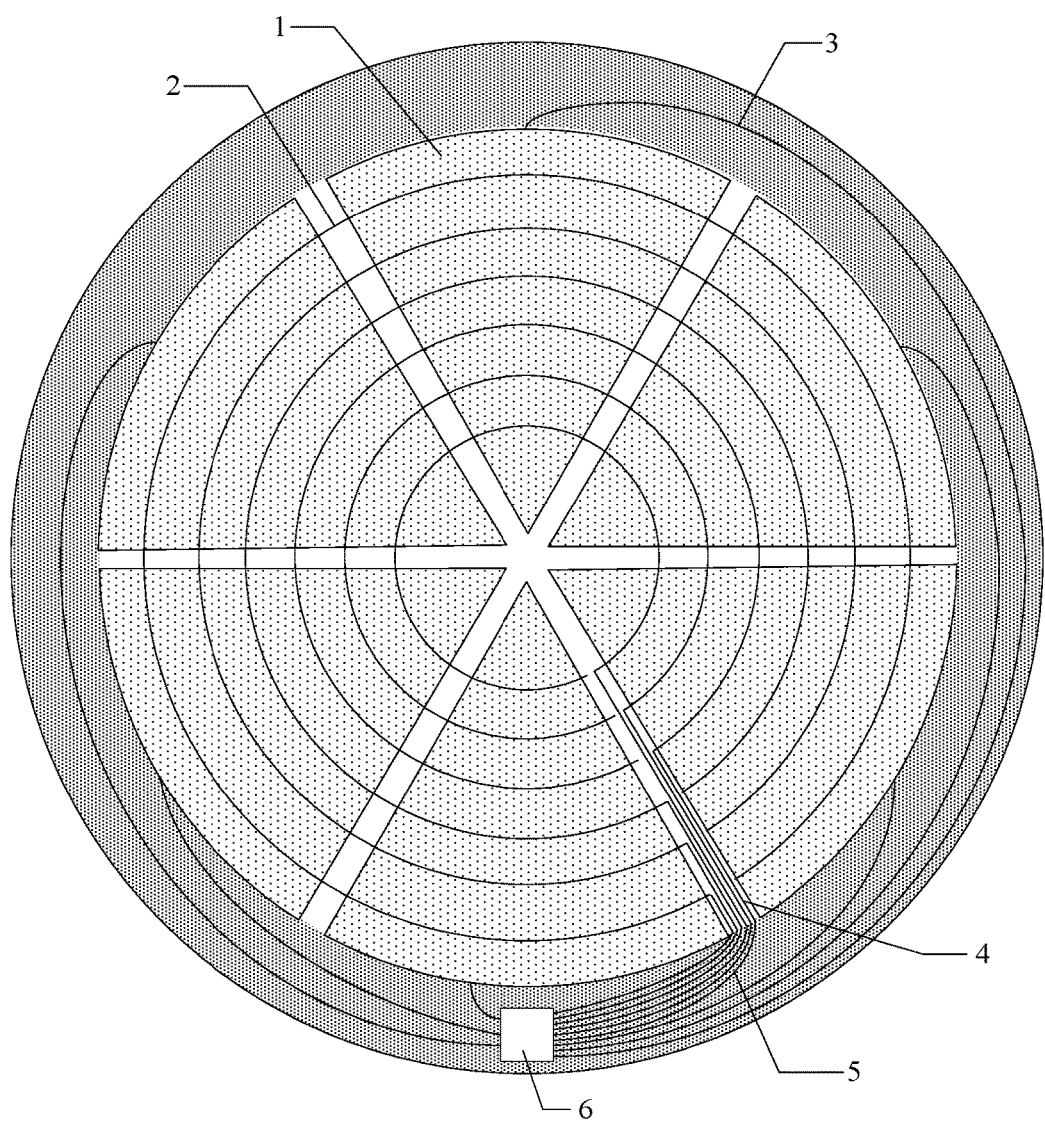
FIG. 4 is a schematic structural diagram of a touch screen according to an embodiment of the present disclosure.
Figure 5:
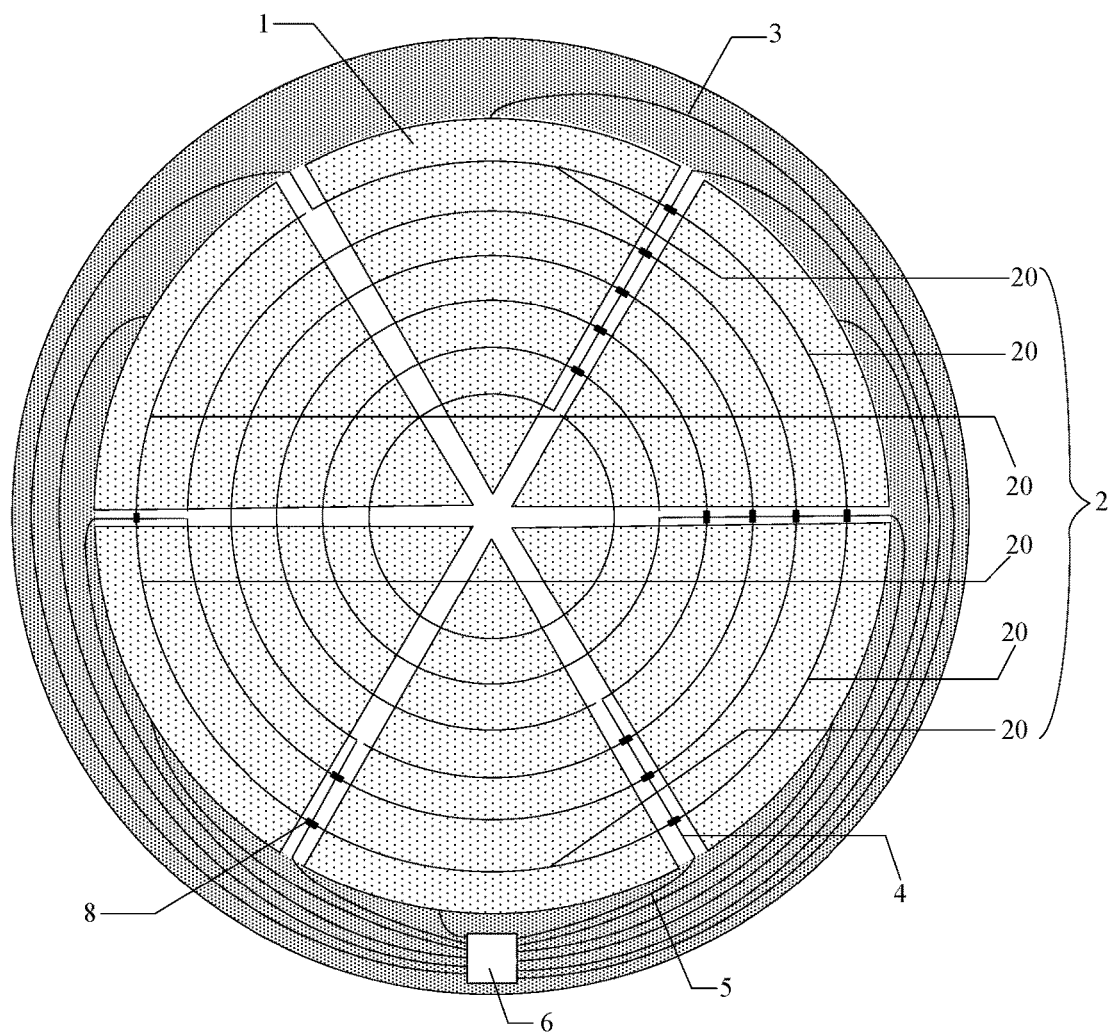
FIG. 5 is a schematic structural diagram of a touch screen according to an embodiment of the present disclosure.
Figure 6:
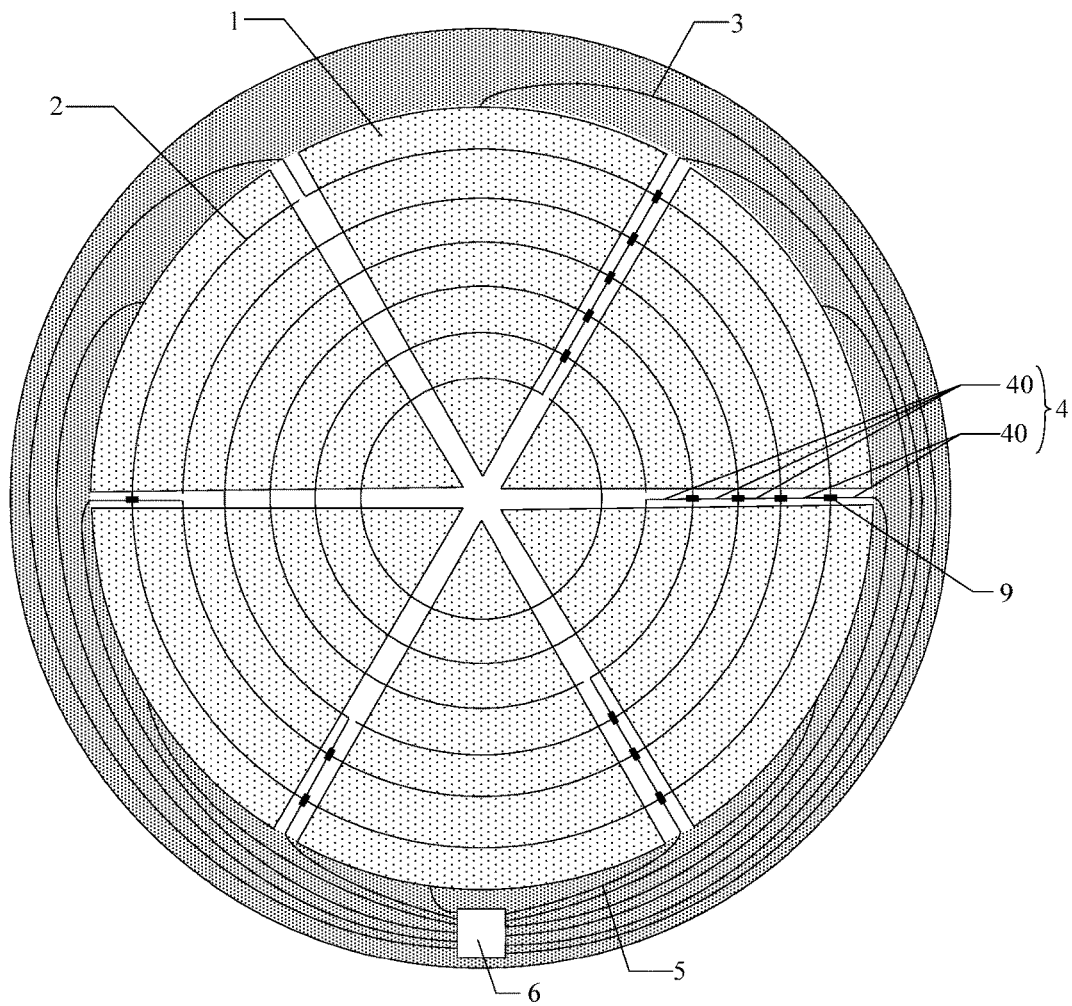
FIG. 6 is a schematic structural diagram of a touch screen according to an embodiment of the present disclosure.

When in specific implementation, in the touch screen provided by the embodiment of the present disclosure, as shown in FIG. 1-FIG. 3, each of the first touch sensing electrodes 1 and each of the second touch sensing electrodes 2 may be arranged in a same layer. That is, a pattern of each of the first touch sensing electrodes 1 and that of each of the second touch sensing electrodes 2 are formed using the same material by way of the same patterning process. In this way, the fabrication technology of the touch screen may be simplified, the fabrication cost of the touch screen may be reduced, and the entire thickness of the touch screen may be reduced. Alternatively, as shown in FIG. 4-FIG. 6, each of the first touch sensing electrodes 1 and each of the second touch sensing electrodes 2 may be arranged at different layers, an insulating layer may be arranged between each of the first touch sensing electrodes 1 and each of the second touch sensing electrodes 2, and each of the first touch sensing electrodes 1 is mutually insulated from each of the second touch sensing electrodes 2. In the present disclosure, it is not limited whether the first touch sensing electrodes 1 and the second touch sensing electrodes 2 are arranged in a same layer.

When in specific implementation, in the touch screen provided by the embodiment of the present disclosure, as shown in FIG. 1-FIG. 3, each of the first touch sensing electrodes 1 and each of the second touch sensing electrodes 2 are arranged in the same layer. To ensure that each of the first touch sensing electrodes 1 is mutually insulated from each of the second touch sensing electrodes 2, each of the first touch sensing electrodes 1 may include a plurality of first touch sensing sub-electrodes 10 arranged along a radial direction and non-overlapped with each of the second touch sensing electrodes 2. The first touch sensing sub-electrodes 10 included in each of the first touch sensing electrodes 1 form a fan shape. In one embodiment, the touch screen may further include: a first electrical bridge 7 configured to electrically connect two adjacent first touch sensing sub-electrodes 10 in each of the first touch sensing electrodes 1. Each of the first electrical bridges 7 and each of the second touch sensing electrodes 2 are arranged in a mutually insulated way. Specifically, in an implementation, an insulating layer may be arranged between each of the first electrical bridges 7 and each of the second touch sensing electrodes 2, and the first electrical bridge 7 electrically connects the first touch sensing sub-electrode 10 through a via hole positioned right above the first touch sensing sub-electrode 10 and through the insulating layer.

When in specific implementation, in the touch screen provided by the embodiment of the present disclosure, as shown in FIG. 1-FIG. 3, when each of the first touch sensing electrodes 1 and each of the second touch sensing electrodes 2 are arranged in the same layer, to ensure that each of the first touch sensing electrodes 1 is mutually insulated from a second touch sensing electrode wire 4 electrically connecting each of the second touch sensing electrodes 2 to ensure that the touch screen can properly work, the second touch sensing electrode wire 4 may be arranged at a spacing between two adjacent first touch sensing electrodes 1.

It is to be noted that in the touch screen provided by the embodiment of the present disclosure, when each of the first touch sensing electrodes and each of the second touch sensing electrodes are arranged at different layers, a second touch sensing electrode wire electrically connecting each of the second touch sensing electrodes and each of the second touch sensing electrodes generally are arranged in a same layer. That is, each of the first touch sensing electrode wires and each of the first touch sensing electrodes are arranged at different layers. Therefore, as shown in FIG. 4-FIG. 6, an orthographic projection of each of the first touch sensing electrode wires 4 on each of the first touch sensing electrodes 1 may be positioned at a spacing between two adjacent first touch sensing electrodes 1. Alternatively, an overlapping region may be provided between each of the first touch sensing electrode wires and each of the first touch sensing electrodes, which is not limited herein.

When in specific implementation, in the touch screen provided by the embodiment of the present disclosure, as shown in FIG. 1 and FIG. 4, an opening of the non-closed ring of each of the second touch sensing electrodes 2 aligns along the radial direction of the circle. That is, each of the second touch sensing electrodes 2 is provided with an opening at the same angle position, and one end of each of the second touch sensing electrodes 2 electrically connects the corresponding second touch sensing electrode wire 4. At this moment, no matter each of the first touch sensing electrodes 1 and each of the second touch sensing electrodes 2 are arranged in a same layer as shown in FIG. 1 or at different layers as shown in FIG. 4, it may be avoided that each of the first touch sensing electrode wires 4 electrically connects other second touch sensing electrodes 2 other than the second touch sensing electrode 2 corresponding to the second touch sensing electrode wire, thereby avoiding having a negative effect on proper operation of the touch screen. It is to be pointed out that the opening "aligning" mentioned herein means that centers of the openings extend roughly centering on the same straight line instead of being strictly in the same straight line.

When in specific implementation, in the touch screen provided by the embodiment of the present disclosure, as shown in FIG. 2, FIG. 3, FIG. 5 and FIG. 6, an arrangement direction of the opening of the non-closed ring of each of the second touch sensing electrodes 2 does not align along the radial direction of the circle. That is, each of the second touch sensing electrodes 2 is provided with an opening in at least two angle positions. Because each of the second touch sensing electrodes 2 and each of the first touch sensing electrode wires 4 generally are arranged in a same layer, to avoid that each of the first touch sensing electrode wires 4 electrically connects other second touch sensing electrodes 2 other than the second touch sensing electrode 2 corresponding to the second touch sensing electrode wire, thereby avoiding having a negative effect on proper operation of the touch screen, it is required that each of the first touch sensing electrode wires 4 is not mutually overlapped with other second touch sensing electrodes 2 other than the second touch sensing electrode 2 corresponding to the second touch sensing electrode wire. Each of the second touch sensing electrodes 2 (as shown in FIG. 2 and FIG. 5) may include a plurality of second touch sensing sub-electrodes 20 arranged along a circumferential direction and non-overlapped with each of the first touch sensing electrode wires 4. To implement electrical connection of the second touch sensing sub-electrodes 20 in the second touch sensing electrode 2, the touch screen (as shown in FIG. 2 and FIG. 5) provided by the embodiment of the present disclosure may further include a second electrical bridge 8 configured to electrically connect two adjacent second touch sensing sub-electrodes 20 in each of the second touch sensing electrodes 2. Each of the second electrical bridges 8 and each of the first touch sensing electrode wires 4 are arranged in a mutually insulated way. Specifically, an insulating layer may be arranged between each of the second electrical bridges 8 and each of the first touch sensing electrode wires 4, and each of the second electrical bridges 8 electrically connects each of the second touch sensing sub-electrodes 20 through a via hole positioned right above each of the second touch sensing sub-electrodes 20 and through the insulating layer.

When in specific implementation, in the touch screen provided by the embodiment of the present disclosure, as shown in FIG. 2, FIG. 3, FIG. 5 and FIG. 6, the opening of the non-closed ring of each of the second touch sensing electrodes 2 does not align along the radial direction of the circle. That is, each of the second touch sensing electrodes 2 is provided with an opening in at least two angle positions. Because each of the second touch sensing electrodes 2 and each of the first touch sensing electrode wires 4 are generally arranged at a same layer, to avoid that each of the first touch sensing electrode wires 4 electrically connects other second touch sensing electrodes 2 other than the second touch sensing electrode 2 corresponding to the second touch sensing electrode wire, thereby avoiding having a negative effect on proper operation of the touch screen, it is required that each of the first touch sensing electrode wires 4 is not mutually overlapped with other second touch sensing electrodes 2 except the second touch sensing electrode 2 corresponding to the second touch sensing electrode wire. Each of the second touch sensing electrodes 4 (as shown in FIG. 3 and FIG. 6) may include a plurality of second touch sensing sub-electrode wires 40 arranged along a radial direction and non-overlapped with each of the second touch sensing electrodes 2. To implement electrical connection of the second touch sensing sub-electrodes 40 in the first touch sensing electrode wires 40, the touch screen (as shown in FIG. 3 and FIG. 6) provided by the embodiment of the present disclosure may further include a third electrical bridge 9 configured to electrically connect two adjacent second touch sensing sub-electrode wires 40 in each of the first touch sensing electrode wires 40. Each of the third electrical bridges 9 and each of the second touch sensing electrodes 2 are arranged in a mutually insulated way. Specifically, an insulating layer may be arranged between each of the third electrical bridges 9 and each of the second touch sensing electrodes 2, and each of the third electrical bridges 9 electrically connects each of the second touch sensing sub-electrode wires 40 through a via hole positioned right above each of the second touch sensing sub-electrode wires 40 and through the insulating layer.

Of course, in the touch screen provided by the embodiment of the present disclosure, an arrangement direction of the opening of each of the second touch sensing electrodes is mutually parallel to at least two radiuses. That is, when each of the second touch sensing electrodes is provided with an opening in at least two angle positions, each of the first touch sensing electrode wires also may be electrically connected to the corresponding third touch sensing electrode wire by an electrical bridge, which is not limited herein.

Optionally, in the touch screen provided by the embodiment of the present disclosure, as shown in FIG. 1 and FIG. 4, two ends of each of the second touch sensing electrodes 2 shaped like the non-closed ring is a first end and a second end respectively. The first ends of a part of the second touch sensing electrodes 2 connect the corresponding first touch sensing electrode wires 4, and the second ends of another part of the second touch sensing electrodes 2 connect the corresponding first touch sensing electrode wires 4. Herein, it can be regarded that the first end is an end at an upstream of the non-closed ring in the clockwise direction, and the second end is an end at a downstream of the non-closed ring in the clockwise direction. Herein, at least two second touch sensing electrodes 2 may be opposite in direction of current, and magnetic fields generated by currents opposite in direction are opposite in direction, which may mutually counteract EMI and EMC interferences, so that interferences generated when the touch screen implements the touch control function may be reduced, and the touch control precision of the touch screen may be improved.

Further, in the touch screen provided by the embodiment of the present disclosure, as shown in FIG. 2, FIG. 3, FIG. 5 and FIG. 6, the second touch sensing electrodes 2 connected to the corresponding first touch sensing electrode wires 4 via the first ends and the second touch sensing electrodes 2 connected to the corresponding first touch sensing electrode wires 4 via the second ends may be arranged at intervals. That is, two adjacent second touch sensing electrodes 2 are opposite in direction of current, and magnetic fields generated by currents opposite in direction are opposite in direction, which may mutually counteract EMI and EMC interferences, so that interferences generated when the touch screen implements the touch control function may be minimized, and the touch control precision of the touch screen may be improved.

Optionally, in the touch screen provided by the embodiment of the present disclosure, to unify and improve the touch control precision of the touch screen, each of the first touch sensing electrodes is substantially equal in area.

Optionally, in the touch screen provided by the embodiment of the present disclosure, to unify and improve the touch control precision of the touch screen, a radius difference of two adjacent second touch sensing electrodes may be set to substantially equal.

When in specific implementation, the touch screen provided by the embodiment of the present disclosure may be used as a touch screen that can display pictures. That is, the touch screen includes a display area and a bezel area enclosing the display area. Alternatively, the touch screen provided by the embodiment of the present disclosure also may be used as a touch pad not used for displaying pictures, which is not limited herein.

Specifically, when the touch screen provided by the embodiment of the present disclosure is used as a touch screen that can display pictures, as shown in FIG. 1-FIG. 6, each of the first touch sensing electrodes 1, each of the second touch sensing electrodes 2 and each of the first touch sensing electrode wires 4 may be arranged within the display area (namely, the area where the circle formed by the first touch sensing electrodes as shown in FIG. 1-FIG. 6 locates) of the touch screen. To not affect normal display of the touch screen, each of the first touch sensing electrodes 1, each of the second touch sensing electrodes 2 and each of the first touch sensing electrode wires 4 may be transparent. Specifically, materials of each of the first touch sensing electrodes 1, each of the second touch sensing electrodes 2 and each of the first touch sensing electrode wires 4 may be transparent conducting oxides (TCO) such as indium tin oxides (ITO), indium zinc oxides (IZO) or indium gallium zinc oxides (IGZO) and so on, which is not limited herein. Each of the third touch sensing electrode wires 3, each of the second touch sensing electrode wires 5 and the touch control chip 6 may be arranged within the bezel area (namely, the area enclosing the display area) of the touch screen. Specifically, materials of each of the third touch sensing electrode wires 3 and each of the second touch sensing electrode wires 5 may be non-transparent metal, which is not limited herein.

It is to be noted that when the touch screen provided by the embodiment of the present disclosure is used as a touch screen that can display pictures, the first electrical bridges, the second electrical bridges and the third electrical bridges are positioned within the display area of the touch screen. When materials of the first electrical bridges, the second electrical bridges and the third electrical bridges are metals, to avoid having a negative effect on the display effect of the touch screen due to light leakage of the first electrical bridges, the second electrical bridges and the third electrical bridges, each of the first electrical bridges, each of the second electrical bridges and each of the third electrical bridges may be arranged within the area where a black matrix in the touch screen is. In the display panel included in the touch screen, the black matrix is a black matrix used for sheltering signal lines for displaying (such as gate lines and data lines). Of course, the materials of the first electrical bridges, the second electrical bridges and the third electrical bridges also may be TCO, which is not limited herein.

When in specific implementation, the touch screen provided by the embodiment of the present disclosure may be used as a dial of a watch. The third touch sensing electrode wires and the second touch sensing electrode wires are arranged within the bezel area of the watch, which may avoid a poor visual effect caused by arranging electrode wires at the center of a circle of the watch. Furthermore, digitals for indicating time are designed in a part, in the display area of the watch, close to the bezel area. Therefore, the third touch sensing electrode wires and the second touch sensing electrode wires can be sheltered by the digitals for indicating time even though the third touch sensing electrode wires and the second touch sensing electrode wires extend from the bezel area to an edge of the display area, which not only may reduce poor visual effect caused by the third touch sensing electrode wires and the second touch sensing electrode wires, but also may implement a narrow bezel design of the watch.

Based on the same inventive concept, an embodiment of the present disclosure further provides a display device, which includes the foregoing touch screen provided by the above embodiments of the present disclosure. The display device may be any product or component having display function, such as a mobile phone, a tablet computer, a TV set, a display, a notebook computer, a digital photo frame, a navigation device and so on. The implementation of the display device may be seen in the embodiments of the foregoing touch screen, and what is repeated is not described again.

Figure 7:
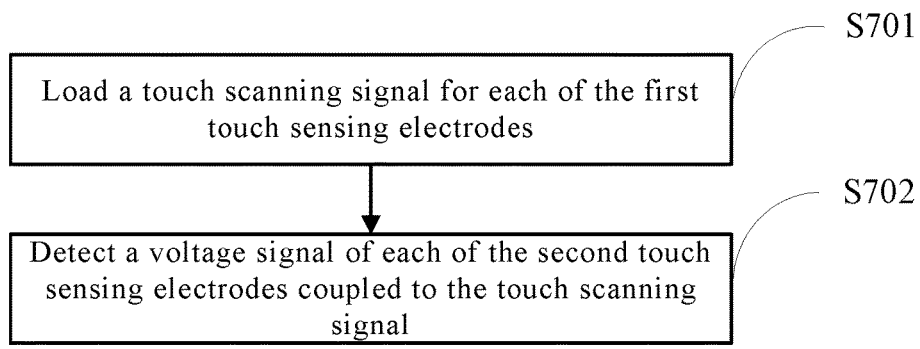
FIG. 7 is a flowchart of a touch positioning method used in the touch screen according to the embodiments of the present disclosure.

For the touch screen provided by the embodiments of the present disclosure, an embodiment of the present disclosure further provides a touch positioning method used in the touch screen. As shown in FIG. 7, the method includes following steps:

S701: loading a touch scanning signal for each of the first touch sensing electrodes, namely, loading an electric signal, one by one, for each of the first touch sensing electrodes; and S702: detecting a voltage signal of each of the second touch sensing electrodes coupled to the touch scanning signal. Specifically, when loading an electric signal for each of the first touch sensing electrodes, whether the voltage signal of each of the second touch sensing electrodes changes is detected. Once it is detected that the voltage signal of a certain second touch sensing electrode changes when loading an electric signal for a certain first touch sensing electrode, a contact position is determined according to an angle variable determined by the first touch sensing electrode and a radius variable determined by the second touch sensing electrode.

Figure 8:
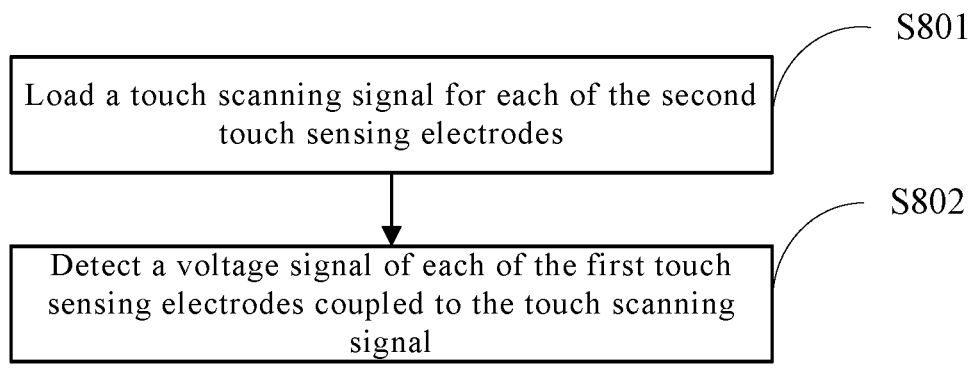
FIG. 8 is a flowchart of a touch positioning method used in the touch screen according to the embodiments of the present disclosure.

Alternatively, as shown in FIG. 8, the method includes following steps:

S801: loading a touch scanning signal for each of the second touch sensing electrodes, namely, loading an electric signal, one by one, for each of the second touch sensing electrodes; and S802: detecting a voltage signal of each of the first touch sensing electrodes coupled to the touch scanning signal. Specifically, when loading an electric signal for each of the second touch sensing electrodes, whether the voltage signal of each of the first touch sensing electrodes changes is detected. Once it is detected that the voltage signal of a certain first touch sensing electrode changes when loading an electric signal for a certain second touch sensing electrode, a contact position is determined according to an angle variable determined by the first touch sensing electrode and a radius variable determined by the second touch sensing electrode.

The embodiments of the present disclosure provide a touch screen and a touch positioning method thereof, and a display device. The touch screen includes: a plurality of mutually insulated fan-shaped first touch sensing electrodes and a plurality of mutually insulated and non-overlapped second touch sensing electrodes mutually insulated from the first touch sensing electrodes. The fan-shaped first touch sensing electrodes are arranged in a circle, and each of the second touch sensing electrodes is shaped like a non-closed ring concentrically arranged with the circle. In this way, a contact position may be determined by determining an angle variable by way of the first touch sensing electrode and by determining a radius variable by way of the second touch sensing electrode. Compared with a touch control structure of an existing strip electrode with two layers of intersecting different planes, the touch screen may reduce requirements for signal stability of the touch control chip and requirements for determining a resolution capability of the contact position, and thus is more applicable to a circular touch screen.

Figure 9:
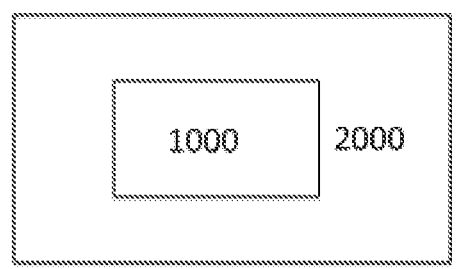
FIG. 9 is schematic diagram showing an example embodiment of a display device.

FIG. 9 is schematic diagram showing an example embodiment of a display device. As shown FIG. 9, a display device 2000 includes an touch screen 1000. In this example embodiment, touch screen 1000 is a touch screen as shown in FIGS. 1, 2, 3, 4, 5 and 6.

Apparently, those skilled in the art may alter or modify the present disclosure without departing from the spirit and scope of the present disclosure. Thus, if these alterations and modifications of the present disclosure fall within the scope of claims of the present disclosure and equivalent technologies thereof, the present disclosure is intended to cover these alterations and modifications.

What is claimed is:

1. A touch screen comprising a plurality of mutually insulated fan-shaped first touch sensing electrodes, a plurality of mutually insulated and non-overlapped second touch sensing electrodes, a plurality of mutually insulated first touch sensing electrode wires and a plurality of mutually insulated second touch sensing electrode wires, the second touch sensing electrodes mutually insulated from the first touch sensing electrodes, the plurality of the first touch sensing electrodes arranged in a circle, each of the second touch sensing electrodes having a non-closed ring shape concentrically arranged with the circle, the plurality of mutually insulated first touch sensing electrode wires extending along a radial direction of the circle and electrically connected to the second touch sensing electrodes in a one-to-one correspondence, and the plurality of mutually insulated second touch sensing electrode wires electrically connected to the first touch sensing electrode wires in a one-to-one correspondence.

2. The touch screen according to claim 1, further comprising a plurality of mutually insulated third touch sensing electrode wires electrically connecting to the first touch sensing electrodes in a one-to-one correspondence, and a touch control chip, each of the first touch sensing electrodes electrically connecting to the touch control chip via a corresponding one of the third touch sensing electrode wires, and said each of the second touch sensing electrodes electrically connecting to the touch control chip via a corresponding one of the first touch sensing electrode wires and a corresponding one of the second touch sensing electrode wires.

3. The touch screen according to claim 1, wherein the touch screen is a dial of a watch.

4. A display device comprising the touch screen according to claim 1.

5. A touch positioning method used in the touch screen according to claim 1, the method comprising:
loading a touch scanning signal for each of the first touch sensing electrodes, and detecting a voltage signal of said each of the second touch sensing electrodes coupled to the touch scanning signal; or
loading a touch scanning signal for said each of the second touch sensing electrodes, and detecting a voltage signal of each of the first touch sensing electrodes coupled to the touch scanning signal.

6. The touch screen according to claim 2, wherein:
the first touch sensing electrodes and the second touch sensing electrodes are arranged in the same layer;
said each of the first touch sensing electrodes comprises a plurality of touch sensing sub-electrodes arranged along a radial direction and non-overlapping with the second touch sensing electrodes; and
the touch screen further comprises an electrical bridge configured to electrically connect two adjacent touch sensing sub-electrodes in said each of the first touch sensing electrodes.

7. The touch screen according to claim 2, wherein the first touch sensing electrodes and the second touch sensing electrodes are arranged in different layers, and wherein the touch screen further comprises an insulating layer arranged between the first touch sensing electrodes and the second touch sensing electrodes.

8. The touch screen according to claim 2, wherein:
said each of the second touch sensing electrodes defines an opening that aligns with the radial direction of the circle; and
one end of said each of the second touch sensing electrodes electrically connects to a corresponding one of the first touch sensing electrode wires.

9. The touch screen according to claim 2, wherein:
said each of the second touch sensing electrodes defines an opening that does not align with the radial direction of the circle;
said each of the second touch sensing electrodes comprises a plurality of touch sensing sub-electrodes arranged along a circumferential direction of the non-closed ring and non-overlapping with each of the first touch sensing electrode wires; and
the touch screen further comprises an electrical bridge configured to electrically connect two adjacent touch sensing sub-electrodes in said each of the second touch sensing electrodes.

10. The touch screen according to claim 2, wherein:
said each of the second touch sensing electrodes defines an opening that does not align with the radial direction of the circle;
each of the first touch sensing electrode wires comprises a plurality of touch sensing sub-electrode wires arranged along a radial direction of the circle and non-overlapping with said each of the second touch sensing electrodes; and
the touch screen further comprises an electrical bridge configured to electrically connect two adjacent touch sensing sub-electrode wires in said each of the first touch sensing electrode wires.

11. The touch screen according to claim 2, wherein:
each of the second touch sensing electrodes includes a first end and a second end; and
the first end of some of the second touch sensing electrodes connects to a corresponding one of the first touch sensing electrode wires, and the second end of the other ones of the second touch sensing electrodes connects to a corresponding one of the first touch sensing electrode wires.

12. The touch screen according to claim 2, wherein said each of the first touch sensing electrodes, said each of the second touch sensing electrodes and each of the first touch sensing electrode wires are positioned within a display area of the touch screen, and wherein said each of the first touch sensing electrodes, said each of the second touch sensing electrodes and said each of the first touch sensing electrode wires are transparent, and wherein said each of the third touch sensing electrode wires, each of the second touch sensing electrode wires and the touch control chip are positioned within a bezel area of the touch screen.

13. A display device comprising the touch screen according to claim 2.

14. The touch screen according to claim 6, wherein two adjacent first touch sensing electrodes define a space therebetween, and wherein the first touch sensing electrode wires are positioned in the space between the two adjacent first touch sensing electrodes.

15. A display device comprising the touch screen according to claim 6.

16. A display device comprising the touch screen according to claim 7.

17. The touch screen according to claim 11, wherein the second touch sensing electrodes connected to the first touch sensing electrode wires via the first ends and the second touch sensing electrodes connected to the first touch sensing electrode wires via the second ends are arranged at intervals.

18. The touch screen according to claim 3, wherein the first touch sensing electrodes are substantially equal in area.

19. The touch screen according to claim 3, wherein a radius difference of two adjacent second touch sensing electrodes is substantially equal for each adjacent pair of the second touch sensing electrodes.

20. A display device comprising the touch screen according to claim 5.

* * * * *